Jan. 1, 1957 — J. DUMAS — 2,775,840

FISHING TACKLE

Filed March 21, 1955

INVENTOR.
JACK DUMAS

By: J E Trabucco
attorney

United States Patent Office 2,775,840
Patented Jan. 1, 1957

2,775,840

FISHING TACKLE

Jack Dumas, San Francisco, Calif.

Application March 21, 1955, Serial No. 495,420

1 Claim. (Cl. 43—42.16)

This invention relates to improved fishing tackle and more particularly to a novel combination lure and line stabilizer.

In trout fishing a rotating type of lure has become quite popular with many anglers. A bright or suitably colored rotating spinner when drawn through the water frequently attracts the fish when flies or other kinds of lures are ineffective. In stream fishing when using a lure of the spinner type considerable trouble is commonly experienced in casting, particularly with respect to the fouling of the line.

The present invention provides a novel combination spinner and weighted line stabilizer which makes it possible for an angler to avoid line fouling when casting.

Among other novel features of my invention is the provision of a sliding weighted line stabilizer which is adapted to become locked with the fish hook and rotating lure assembly when casting, thereby usually avoiding the fouling of the tackle by reason of the hook catching on the line. The sliding weighted stabilizer being free to slide along the leader or line allows the fish when hooked to carry the hook and lure assembly away from the stabilizer, thereupon substantially eliminating the resistance of the weighted stabilizer to the movement of the fish, and thereby making it more difficult for the fish to free itself from the hook. The distribution of the weight of the stabilizer is such that when the lure and hook assembly are in locked relation with the stabilizer, the fishing line and leader are held against rotary movement, although the lure is free to rotate when the line is drawn through the water.

The primary object of my invention is to provide novel fishing tackle of the kind characterized, such tackle being designed to give improved fishing results and at the same time lessen the difficulties occasioned by line fouling.

Other and further objects and advantages of my invention will be pointed out hereinafter, or will be indicated in the appended claim, or will be obvious to one skilled in the art upon an understanding of the present disclosure. For the purpose of this application, I have elected to show herein certain forms and details of fishing tackle representative of my invention; it is to be understood, however, that the embodiments of my invention shown and described herein are for the purpose of illustration only, and that therefore they are not to be regarded as exhaustive of the variations of the invention in the art.

Figure 1:
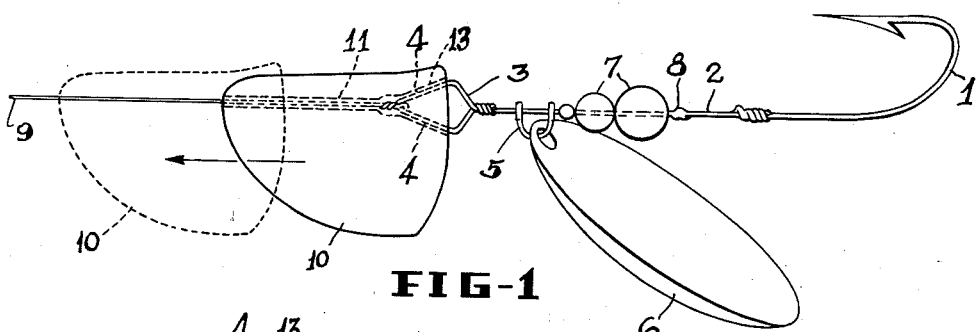
Fig. 1 is a side elevation of a combination fish hook, line stabilizer and rotating lure, representative of my invention.
Figure 2:
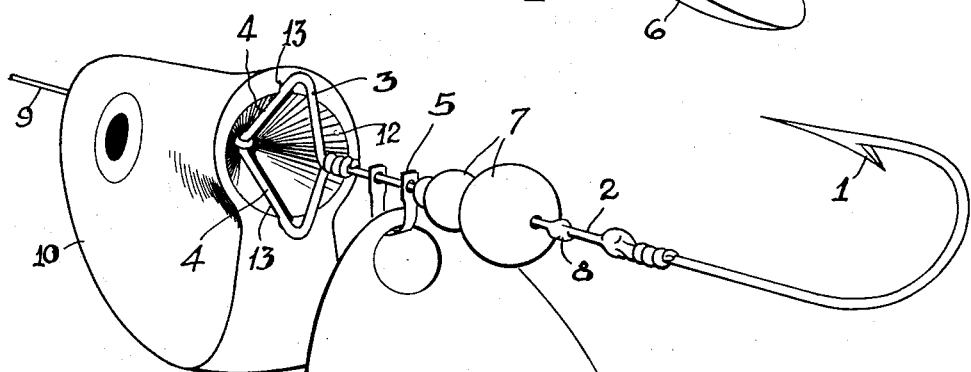
Fig. 2 is a perspective view of the same.
Figure 3:
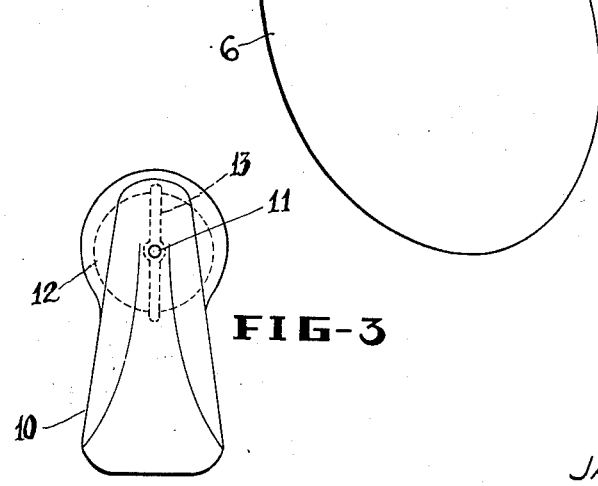
Fig. 3 is an end view of the line stabilizer.

Referring to the drawing, a fish hook 1 of suitable shape and construction is shown as having an elongated, substantially straight shank 2 of stiff wire or other suitable material rigidly secured thereto. The shank 2 is secured rigidly at its forward end to a weight engaging element 3, which is preferably formed with forwardly converging members 4. In the form shown, the shank 2 and the weight engaging element 3 are shown as being made from a length of stiff wire which is suitably bent to provide the converging members 4.

Rotatably mounted on the shank 2 is a yoke 5 to which is connected a spinner or spoon 6 of suitable shape and construction. Suitably colored beads 7 are also threaded on the shank, such beads being preferably positioned between the yoke 5 and a fixed enlargement 8 on the shank. It will be noted that the fish hook 1, the shank 2 and the weight engaging element 3 are integrally connected one to another, and that the yoke 5 and the spinner 6 are free to turn around the shank 2.

Connected to the forward end of the weight engaging element 3 is a leader or line 9, and slidably mounted thereon is a weight member, sinker, or weighted stabilizer 10. The weight member is made of metal or other non-buoyant material and is of suitable shape, and provided in its upper portion is a longitudinal opening 11 through which the leader slidably extends. The greater preponderance of the mass of the weight member 10 is suspended below its longitudinal opening 11, thereby making it possible for the force of gravity to exert a vertical pull which tends to prevent the weight member from rotating about the leader. The rear end of the weight member 10 is formed with a cone shaped aperture 12 having a side wall which converges at the rear end of the longitudinal opening 11. The side wall of the cone shaped aperture 12 is formed with opposed converging grooves 13 which are adapted to receive and releasably hold the forwardly converging members 4 of the weight engaging element 3. The angular positions of the converging members 4 are such that they are adapted to fit in the cone shaped aperture 12 and slidably bear against the latter's side wall.

The aperture 12 in the weighted line stabilizer may assume any other suitable shape, and the weight engaging element 3 may also embody other forms corresponding to the shape of the aperture. It is also to be understood that the weight engaging element may have a solid body with converging side edges.

In casting, when the line is extended and the hook and rotating lure assembly are manually propelled through the air, the weight member 10 slides rearwardly on the leader 9 until its rear end portion engages with the weight engaging element 3. The converging members 4 of the weight engaging element engage with the converging sides of the cone shaped aperture 12 and prevent the hook from swinging forwardly to foul the line. When the hook, lure and weight member strike the water and submerge, the weight member then assumes its function of a line stabilizer as these elements are drawn forwardly through the water. The spinner 6 rotates about the shank 2, but the torque is not effectively transmitted to either the shank or the line because the converging members 4 of the weight engaging element 3 have become lodged in the converging grooves 13 of the weight member, and the said weight member is normally held by gravity against rotation. When a fish is hooked, it normally exerts a pull on the line in a direction away from the weighted member, thereby carrying the hook, spinner and weight engaging element in the direction of the pull. The weight engaging element 3 is freed from its engagement with the weight member, thereupon allowing the comparatively light hook and spinner assembly to be carried by the fish without any accompanying drag of the heavier weight member. Since the weight member then exerts no appreciable contra force, the fish is not apt to break loose from the hook. The freeing of the weight member from the lure and hook assembly after the fish is hooked allows the angler to obtain considerably more enjoyment in playing the fish than would be possible with the weight member rigidly connected to the hook, as in other types of commonly used fishing tackle.

What I claim is:

In fishing tackle, a fish hook, an elongated rigid shank connected at one end to the fish hook, a sinker engaging element rigidly secured to the other end of the shank, the sinker engaging element having forwardly converging side members, a line secured to the sinker engaging element at the forward converging ends of the side members, a sinker slidably mounted on the line and arranged for sliding movement to and from an engaging position with the sinker engaging element, the sinker having a longitudinal line receiving opening in its upper portion, the said line slidably extending through the longitudinal opening, the sinker also having a cone shaped opening in its rear end, the side wall of the cone shaped opening converging at the rear end of the longitudinal opening, and the said converging side wall of the cone shaped opening having opposed converging grooves, the said forwardly converging side members of the sinker engaging element being arranged to fit slidably into the cone shaped opening and also to become lodged in the converging grooves when the sinker is in an engaging position with respect to the sinker engaging element, and a spinner rotatably mounted on the shank.

References Cited in the file of this patent

UNITED STATES PATENTS

| | | |
|---|---|---|
| 1,250,473 | Ladd | Dec. 18, 1917 |
| 1,434,204 | Grounsell | Oct. 31, 1922 |
| 1,754,567 | Newell | Apr. 15, 1930 |
| 2,036,954 | Murray | Apr. 7, 1936 |
| 2,397,968 | Lind | Apr. 9, 1946 |
| 2,419,037 | Safford | Apr. 15, 1947 |
| 2,609,633 | Cracker | Sept. 9, 1952 |
| 2,674,823 | Gellings | Apr. 13, 1954 |

FOREIGN PATENTS

| | | |
|---|---|---|
| 19,600 | Great Britain | 1901 |
| 912,074 | France | 1946 |